United States Patent [19]
Van Raden et al.

[11] Patent Number: 5,230,528
[45] Date of Patent: Jul. 27, 1993

[54] LIFT AXLE WHEEL ASSEMBLY

[75] Inventors: Wayne B. Van Raden; Bruce B. Van Raden, both of Portland, Oreg.

[73] Assignee: Van Raden Industries, Inc., Portland, Oreg.

[21] Appl. No.: 813,377

[22] Filed: Dec. 23, 1991

[51] Int. Cl.⁵ ............................................. B60G 11/26
[52] U.S. Cl. ..................................... 280/704; 280/711
[58] Field of Search ............... 280/704, 711, 713, 716, 280/717, 661

[56] References Cited
U.S. PATENT DOCUMENTS

| 3,737,174 | 6/1973 | Hickman | 280/717 |
| 4,293,145 | 10/1981 | Taylor | 280/81.6 |
| 4,858,948 | 8/1989 | Raidel | 280/711 |
| 4,881,747 | 11/1989 | Raidel | 280/704 |
| 5,015,004 | 5/1991 | Mitchell | 280/81.6 |

FOREIGN PATENT DOCUMENTS
1320497 6/1973 United Kingdom .

Primary Examiner—Kenneth R. Rice
Attorney, Agent, or Firm—Chernoff, Vilhauer, McClung & Stenzel

[57] ABSTRACT

An improved, light-weight left axle wheel assembly attached to the frame of a load carrying vehicle, used to increase the capacity, performance and safety of the vehicle. The left axle wheel assembly has a pair of inflatable airbags for alternately raising or lowering an attached pair of wheels and tires. The left axle wheel assembly has a pair of resilient bushings that dampen and reduce the transfer into the vehicle frame of the torque and stress caused when the tires traverse uneven terrain such as curbs. The assembly also has a pair of caster adjusting torque arms mounted at oblique angles with respect to the vehicle frame and each other that also help to reduce the transfer of torque and stress into the vehicle frame.

8 Claims, 6 Drawing Sheets

LIFT AXLE WHEEL ASSEMBLY

BACKGROUND OF THE INVENTION

This invention relates to an integrated, improved self-steering lift axle wheel assembly of the type used to increase the capacity, performance and safety of load-carrying vehicles, wherein the lift axle wheel assembly may be moved downward, contacting the surface of the road when the vehicle is heavily loaded, thereby sharing the load. Alternatively, when the vehicle is not heavily loaded the lift axle wheel assembly may be lifted upward, away from the surface of the road, thereby reducing friction. Some of the benefits offered by the improvements disclosed herein include:

(1) a significant reduction in the weight of the assembly which translates into increased fuel efficiency and payload capacity for vehicles so equipped; and (2) torque and stresses caused by irregularities in road surfaces are absorbed by the composition and placement of the components, and not transferred into the vehicle frame and driver, thereby resulting in less maintenance on the vehicle and increased driver comfort.

Lift axle wheel assemblies have been conventionally used by the trucking industry to respond to and comply with the various state regulations for limiting the maximum gross weights that trucks may legally carry on interstate roads. The weight of a loaded truck is transferred onto the available axles and wheels that support the vehicle. Calculations of gross weight are generally referenced to a maximum weight per axle. If a truck is equipped with a lift axle wheel assembly and desires to carry a load that would exceed the legal or safe limits imposed by the fixed axle configuration of the vehicle, the lift axle wheel assembly may be placed in its downward position, thereby transferring a portion of the load borne by the fixed axles and wheels onto the lift axle wheel assembly. The vehicle may thereby comply with the applicable regulations while still carrying the greater load that would otherwise require a second trip or a second vehicle. There is also a corresponding decrease in damage to road surfaces because of the more equal distribution of weight.

There are other important benefits that make the availability of a lift axle wheel assembly desirable. Because an assembly of this type may be retracted into its upward position when extra load-carrying capacity is not needed, the decrease in fuel consumption caused by the increased friction that would otherwise occur with an increase in the number of tires contacting the surface of a road is limited to those instances when more carrying capacity is essential and the lift axle wheel assembly is extended downward in its engaged position. A single vehicle may thus haul loads with different weights and still function with fuel efficiency. Moreover, wear on the tires associated with the lift axle wheel is limited to just those periods when the assembly is in use. Other ancillary, yet important benefits are increased driver comfort and vehicle control. Stresses that are produced by road surface irregularities are absorbed by the lift axle wheel assembly, not the driver or by vehicle equipment. Thus, driving is made less physically demanding and tiring. Because the stresses that the vehicle are subject to are more widely dispersed and distributed, vehicles equipped with a lift axle wheel assembly tend to maintain a longer useful life and require less frequent maintenance, and are not as prone to "shimmy" due to resonant frequency effects caused by road surfaces.

As mentioned earlier, the use of auxiliary lift axle wheel assemblies for the reasons stated above is well known. The prior art includes lift axle wheel assemblies of various designs whereby inflatable air bags are used to force the assembly into a downward position relative to the vehicle frame, causing the tires on the assembly to contact the road surface, and thereby redistributing the weight of the load and adding to the gross vehicle weight. Mounting of the air bags has been made directly to the axle and frame, as shown in U.S. Pat. No. 3,730,549. Another method of mounting is shown in U.S. Pat. No. 3,771,812 in which the lift wheel assembly is supported at its ends by pivotable levers whose other ends are mounted to the vehicle frame, and inflatable air bags are mounted to the respective levers midway between the ends of the pivotable levers. In both of the aforedescribed prior art configurations, the introduction of air into the air bags forces the assembly downward, away from the frame and into contact with the road surface.

Systems to return or maintain the lift axle wheel assembly in its retracted position, up and out of contact with the surface of the road, have generally been based on the use of springs, a second pair of inflatable air bags, or a combination of springs and a second pair of air bags. U.S. Pat. No. 3,772,812 shows the use of a coil tension spring that is expanded by the downward motion of the lift axle assembly caused by the introduction of air into the air bags. When the air in the air bags is exhausted, the springs, which are normally biased in a closed position, return the lift axle wheel assembly into an up position. Leaf springs have been used in place of coil tension springs to accomplish the same result. In a lift axle wheel assembly that uses a pivotable lever mounting, it is possible to design the levers in such a manner that inflatable air bags are mounted on lever ends which are opposite the ends that attach to the lift axle wheel assembly. The assembly is raised into an upward position by the forcing of air into this pair of air bags, while the exhaustion of air therefrom forces the lift axle wheel assembly into its downward, engaged position.

SUMMARY OF THE INVENTION

The present invention relates to an improved form of self-steering lift axle wheel assembly for load-carrying vehicles. In its preferred embodiment, the assembly includes a pair of L-shaped pivoting trailing arm assemblies with an aperture at one end containing a bushing sleeve into which a resilient urethane bushing is inserted. The trailing arm assembly attaches to the axle perch of the lift axle assembly by a pin inserted through the axle perch ear and through the urethane bushing. The connection of the trailing arm assembly to the axle perch via a urethane bushing, as so described, results in a dampening of the stresses that would otherwise be transferred from the wheels and axle, up and through the trailing arm assemblies, into the bolster assemblies, and ultimately into the frame of the vehicle and the driver. The trailing arm assembly itself pivots on a bolster pivot bolt and urethane compression tube inserted through a hole provided near the bend in the trailing arm assembly. The front of the trailing arm assembly is mounted to an inflatable air bag located within the bolster assembly. When this air bag is inflated, the lift axle wheel assembly is brought into, or maintained in, its normally up, retracted position. A pair of inflatable air bags are attached between the top of the axle perch and the bottom of the frame of the vehicle, in a position in back of the bolster. When these air bags are inflated, the lift axle wheel assembly is forced into a downward position, into contact with the road surface.

Other connections between the bolster assemblies and axle perch are provided by the use of shock absorbers and caster adjusting torque arms. Caster adjusting torque arms are not new in the art; however, in the present invention the selective placement of these arms results in a more efficient transfer and absorption of forces produced by the interactions of the axle and wheels on uneven road surfaces. Traditionally, one end of the caster adjusting torque arms have been mounted by brackets mounted on the outward facing side of the bolster assemblies, and the other ends mounted to brackets on the axle perch. Mounted thusly, the caster adjusting torque arms were parallel with each other and parallel to the frame of the vehicle. This parallel mounting of the caster adjusting torque arms allowed the transfer of torque and forces to the metal brackets and welds, causing premature wear and tear. In contradistinction, in the present invention the attachment of the caster adjusting torque arms at the bolster assemblies is made at a bracket positioned on the rear bolster wall. The caster adjusting torque arms are not parallel to each other or the frame of the vehicle, but are obliquely angled with the bolster pivot mounting closer to the frame and the axle pivot mounting farther away from the frame. This arrangement allows the caster adjusting torque arms to move in the direction of the axle as it flexes inside the bushings in such events as one wheel of the vehicle going over a curb, rock or other obstruction. In addition to allowing a greater range of wheel motion, the arrangement reduces stresses on the metal brackets and welds of the assembly by absorbing the impact forces and constant torquing of the assembly as the vehicle goes over the road.

A principal benefit of the improved suspension configuration provided by the present invention is that less force is required to lift the lift axle wheel assembly into its retracted position. Another important benefit is that there is an overall weight reduction in the lift axle assembly—this is a major consideration because of the direct correlation between increased weight and decreased fuel efficiency. A further benefit is that the driver is not required to exert as much energy to maintain control of the vehicle because the forces caused by road surface irregularities are in large part not transferred through the steering mechanism. The result is that drivers do not become as tired as quickly, braking and vehicle stability are increased, and thus driving is made safer. A further benefit is that when the lift axle is in use the total tire surface in contact with the road surface enables the hauling of heavier payloads on roads that are subject to strict state and federal road surface statutes. Vehicles that are not equipped with lift axle wheel assemblies are unable to haul corresponding payloads on the same roads because of the lesser tire area that contacts the road surface.

Therefore, it is an object of this invention to provide a lift axle wheel assembly which is of improved, lightweight design having better riding characteristics and enhanced fuel efficiency.

It is a further objective of this invention to reduce maintenance needs for the assembly and associated vehicle.

It is yet a further objective of this invention to provide a design having better riding characteristics and thus to decrease the long haul driving stresses that truck drivers must cope with.

These and other objects, features and advantages of the present invention will become apparent from reference to the following description, attached drawings and appended claims.

DETAILED DESCRIPTION OF THE INVENTION

Figure 1:
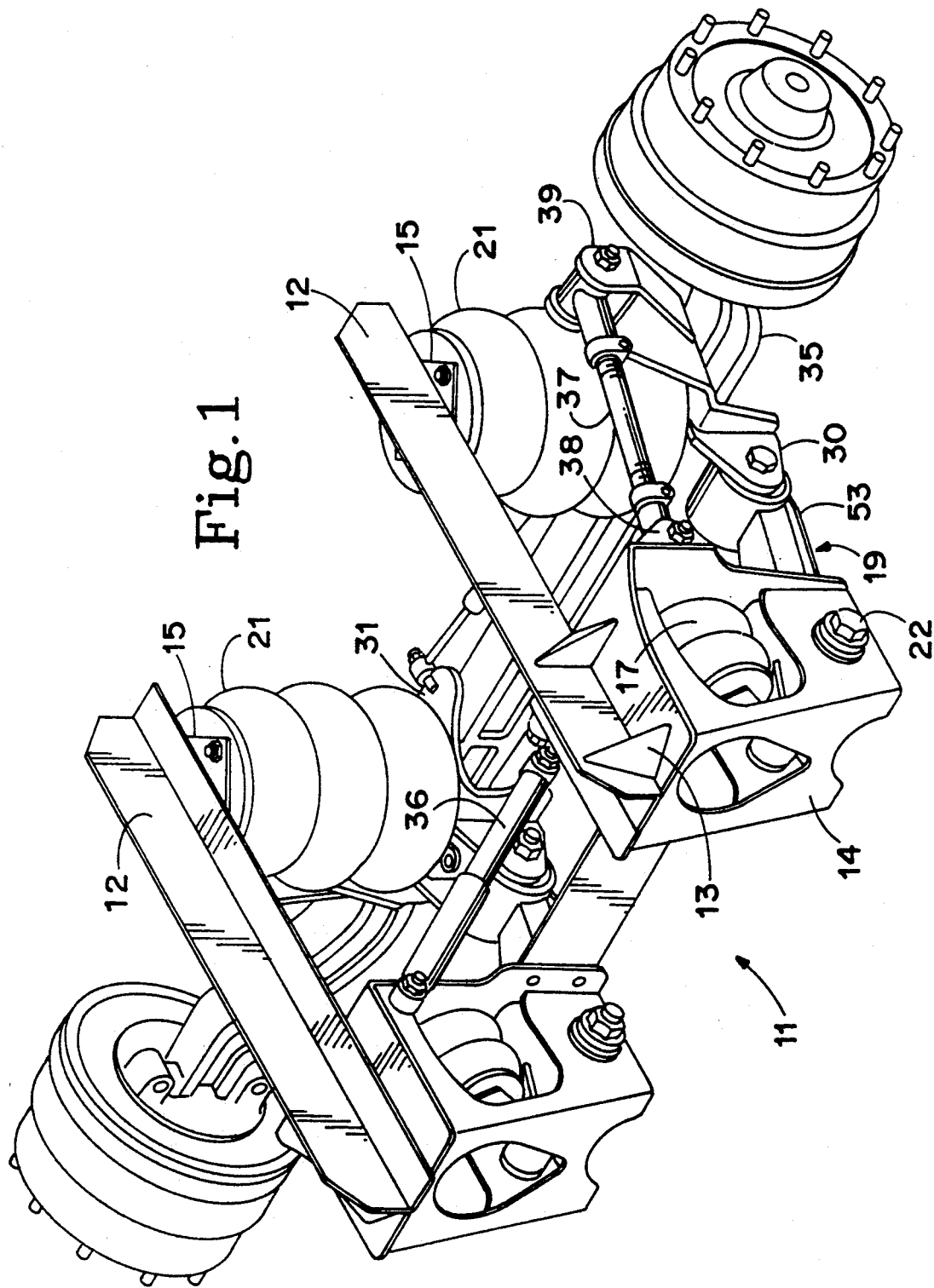
FIG. 1 is a top perspective view of and illustrative embodiment of the lift wheel axle assembly according to the invention showing a complete assembly minus tires.

FIG. 1 is a top perspective view of a complete lift wheel axle assembly 11, minus the tires.

Figure 2:
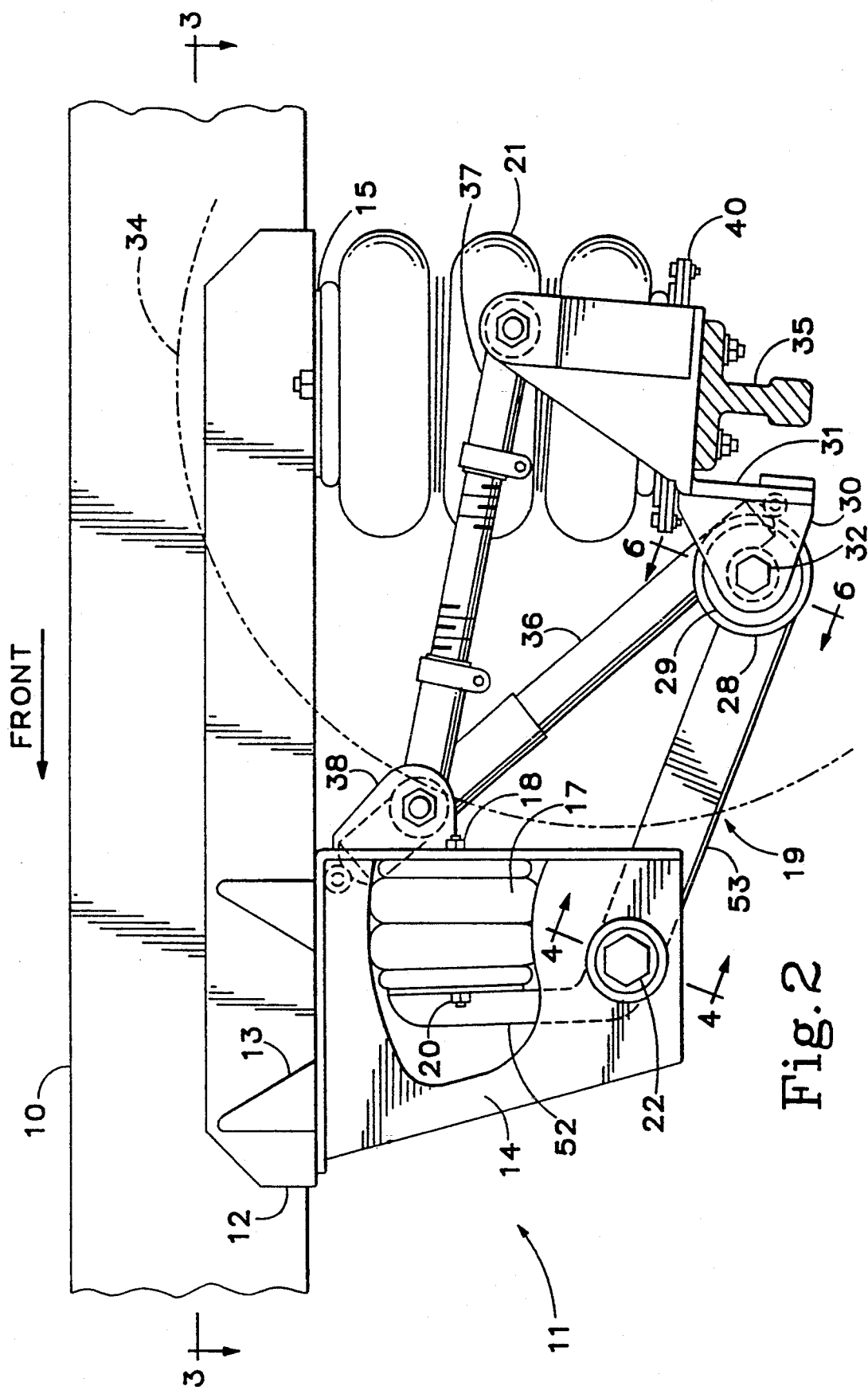
FIG. 2 is a side view of and illustrative embodiment of the lift axle wheel assembly according to the invention in its downward position.
Figure 3:
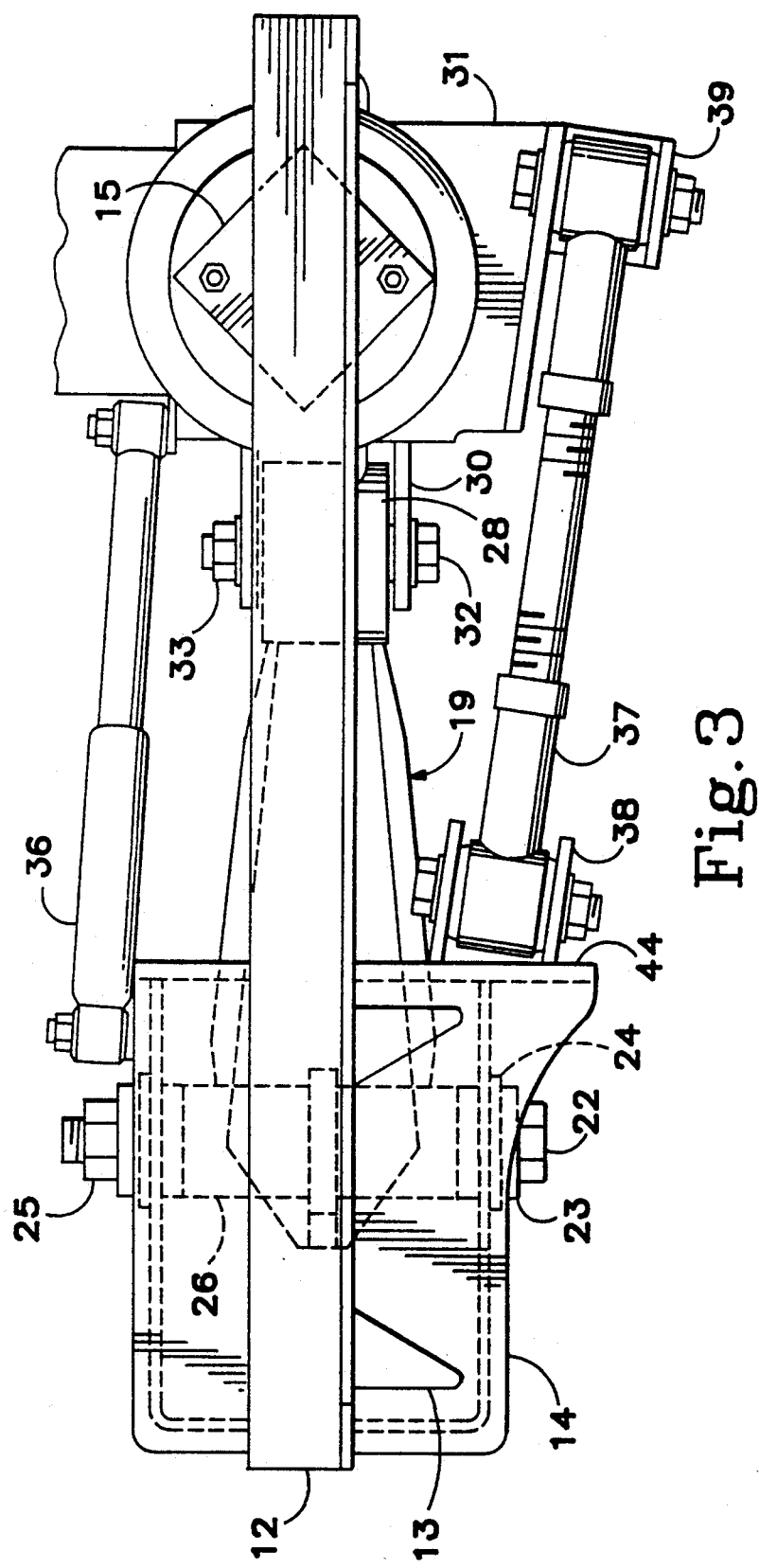
FIG. 3 is a top view of one half of the left wheel axle assembly, taken along the line 3—3 of FIG. 2, with the lift bag and ride bag removed for purposes of clarity.

Referring now to the drawings, FIGS. 2 and 3 illustrate the lower portion of a load-carrying vehicle support frame 10, supported by vehicle wheels (not shown) and a lift axle wheel assembly 11 according to the present invention depicted in its engaged and downward position. (FIG. shows only one-half, or one side, of the wheel axle assembly, and it is to be understood that the other half is the mirror image thereof.)

The lift axle wheel assembly 11 is mounted to the vehicle support frame by pusher mount angle brackets 12. At the front of the assembly, angled bolster mount gussets 13 are welded to the top of the bolster assembly 14 and to the sides of the pusher mount angle bracket. At the rear of the assembly, ride bag upper mount plate 15 is welded to the pusher mount angle bracket 12. Ride bag 21 is attached to the upper mount plate by nut-and-bolt fastener 16.

At the front of the bolster assembly 14 is a horizontally mounted inflatable lift bag 17, with one end attached to the inside of the bolster assembly by a bolt 18, and the other end attached by bolt 20 to one end of the lift bag pivot arm 52 of the L-shaped trailing arm assembly 19.

Figure 4:
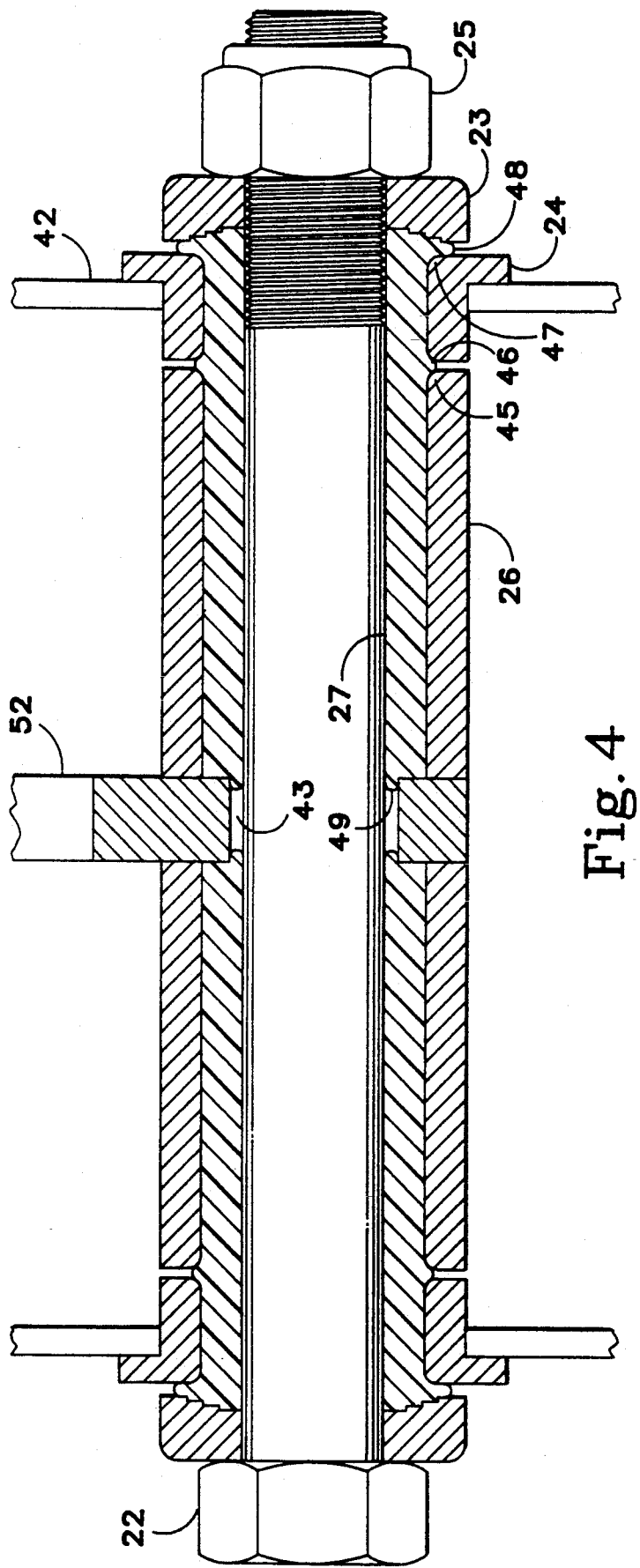
FIG. 4 is a sectional view of the pivot portion of the trailing arm bolster taken along line 4—4 in FIG. 2.
Figure 5:
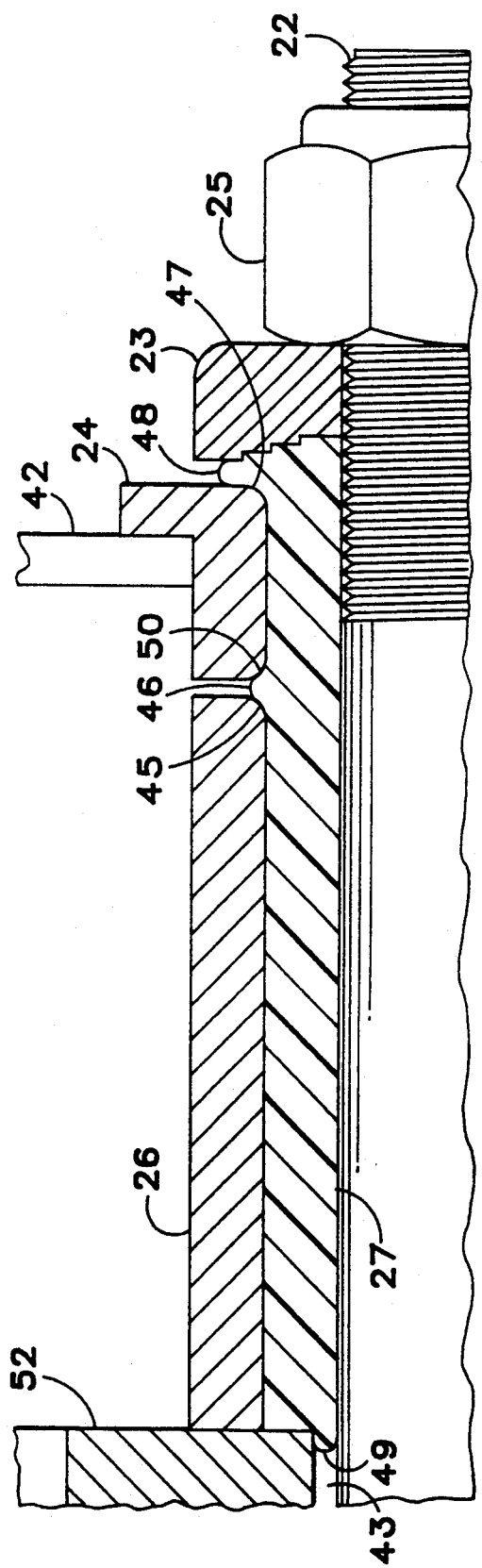
FIG. 5 is an enlarged partial sectional view of the pivot portion of the trailing arm bolster shown in FIG. 4.

Referring now to FIGS. 3-5, the trailing arm assembly 19 pivots about a bolster compression bolt 22 that is inserted through aligned openings in the respective side walls 42 of the bolster assembly 14, bushing 27, and a bore 43 in the pivot arm 52. Compression rings 23 and compression insert collars 24 are placed between the head of the bolt 22 or its fastening nut 25, respectively, and the exterior of the adjacent side wall 42. On the interior of the bolster assembly, the pivot arm 52 is centered on the bolt by equal lengths of bushing sleeving 26 made from shelby tubing and urethane compression tubing 27. By tightening the bolt, pressure is exerted against the sides of the arm by the compression tube. The bolt is thus centered in the bore 43 in the arm, and any lateral movement of the arm relative to the bolt 22 is cushioned by the resilient urethane compression tubing.

Referring now to FIG. 4 and 5, when nut 25 is tightened, the compression between compression ring 23 and the outwardly facing corner radius 47 of collar 24 pinches compression tube 27, creating a rounded-over bump 48. Because 47 is a radius and not a sharp angle, the collar does not cut into the compression tube, but rather the two surfaces are conformingly mated over a relatively large surface area. Because there are no sharp corners, the up and down movement between the compression tubing and the collar do not cut into the sleeve and thus these components have an increased useful life, because the effective area of contact has been increased.

Referring now in particular to FIG. 5, opposite radius 47, at the other end of collar 24 is another rounded-over radius 50. The corresponding corner 45 of compression tubing 27 opposite radius 50 is similarly rounded over, forming a radius. When fastening nut 25 is tightened, the compressive forces created between radius 47 and radius 50 pinch bushing sleeve 26, forming a rounded-over swelling or bump 46 that conforms to the radii. The effective area of contact is increased, resulting in an increased useful life.

At the end of sleeve 26 opposite flanged head 48, a rounded nub 49 protrudes into the air gap formed by the slight difference in the respective diameters of the bore 43 in lift bag pivot arm 52 and bolt 22. Nub 48 accommodates the side loading induced in the bushing when the nut is fastened.

The rearward end of trailing arm assembly 19 terminates in a bushing sleeve 28 into which a resilient urethane bushing 29 is inserted. The bushing sleeve is inserted into an axle perch ear 30 mounted on the axle perch 31. Bolt 32 is inserted through aligned holes in the axle perch ear and through the bushing, and held by nut 33. Axle perch ear 30 is comprised of two plates welded to axle perch 31 in a position spaced apart slightly greater than the length of the bushing. The top of the perch ear is curved to mate with the radius of the top of the axle perch, resulting in an extremely strong welded attachment which is better able to resist torque and stresses than a simple butt weld of the perch ear to the vertical face of the axle perch. The perch ear 30 also has a tab 51 that is inserted through a corresponding slot in the axle perch 31. The result is that more surface space for welding is provided, and the pieces are integrally connected to resist shear forces that could result in a catastrophic separation.

The connection of the axle perch 31 to the trailing arm assembly 19 via a resilient urethane bushing results in a dampening of the lateral forces that occur when the tires 34 and axle 35 traverse unequal terrain. This is a primary advantage of the improved lift axle wheel assembly, as prior designs allowed many of those forces to be transferred up and through the trailing arm assembly into the bolster assembly, and ultimately into the frame of the vehicle and the driver.

Figure 6:
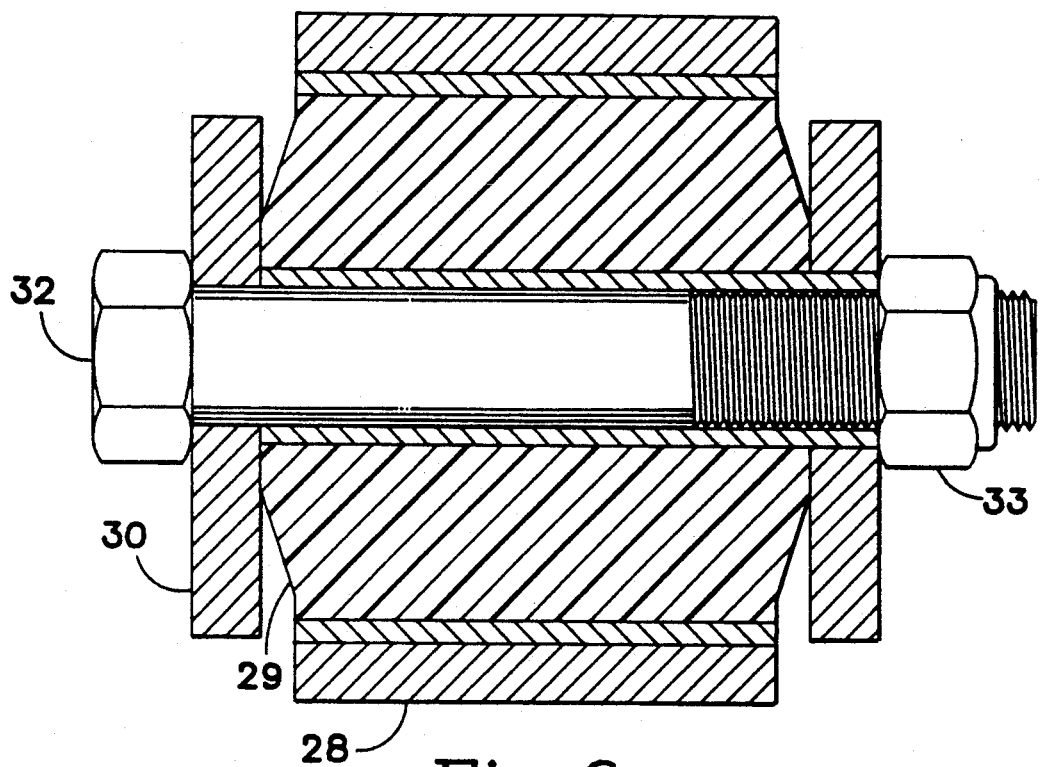
FIG. 6 is a sectional view of the bushing sleeve and bushing taken along line 6—6 in FIG. 2.
Figure 7:
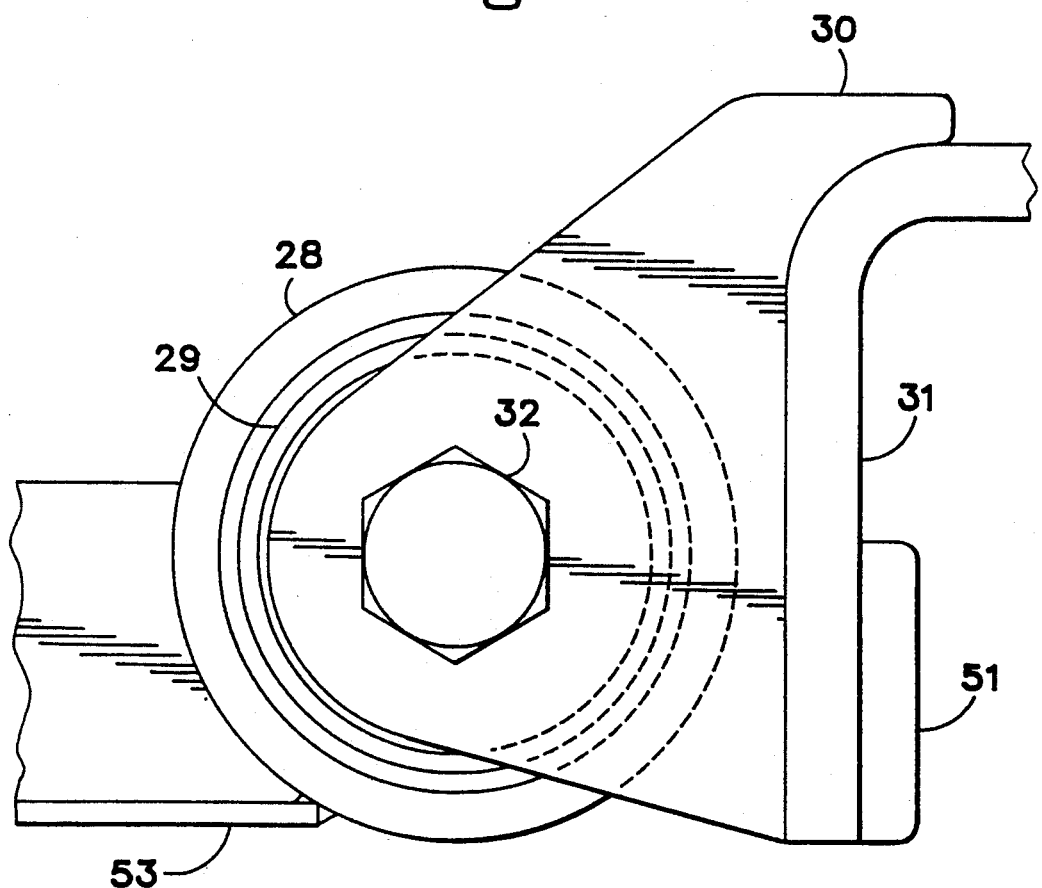
FIG. 7 is a side view of the pivot portion of the trailing arm assembly, perch ear and axle perch.

Referring now in particular to FIG. 2, it can be seen that trailing arm 53 is splayed, the welded connection at bushing sleeve 26 being wider than the welded connection at bushing sleeve 28. Bushing 29 (FIG. 6), inserted in sleeve 28, has a larger diameter and is thicker than the compression tube 27 inserted in sleeve 26. The importance of these dimensions relative to each other is the dampening effect that occurs when torque is induced at the axle perch. Initial torque forces are induced in bushing 29, which, because of its dimensions and resiliency, absorbs and dampens most of those forces. Any forces that are transferred through the trailing arm 53 must travel from the narrow welded connection at bushing 26 up through the gradually wider trailing arm and into wider but thinner compression tube 27. While there is comparatively little force or movement at the compression tube 27, what movement there is, is spread out over a large surface area.

Additional connections between the axle perch 31 and the exterior of the bolster assembly on each side are made by a respective shock absorber 36 and an associated caster adjusting torque arm 37, the use and deployment of both being well known in the art. Both ends of the aforementioned arm member 37 have resilient bushings inserts (not shown) therein. Traditionally, one end of the torque arm has been mounted to a bracket mounted on the outward facing side of the bolster assembly, and the other end has been mounted to brackets on the axle perch. Mounted thusly, the arms were parallel to each other and the frame of the vehicle. In contradistinction, in the present invention the attachment of the caster adjusting torque arm 37 at the bolster assembly 14 is made at a U-shaped bolster pivot bracket 38 positioned on rear bolster wall 44 and angled obliquely outwardly. The attachment of the torque arm 37 to the axle perch 31 is made to a bore in axle pivot bracket 39 which is welded to the axle perch and angled at the same angle as the bracket 38 on the bolster assembly that holds the opposite end of the torque arm. In such an arrangement the pair of torque arms located on the respective sides of the lift axle wheel assembly are not parallel to each other or the frame of the vehicle, but obliquely canted. It has been found by mounting the arms thusly that the torque and forces caused by such events as one wheel of the vehicle going over a curb can be more fully absorbed by the resilient urethane bushings, rather than being allowed to transfer to the metal brackets and welds of the assembly.

Mounted atop the axle perch 31 by a lower mount assembly 40 is a pair of inflatable ride bags 21. The top of the ride bag is mounted to the pusher mount angle bracket 12 by an upper mount plate 15. It is the expansion of these bags and the corresponding deflation of the lift bags 17 located in the bolster assembly that causes the whole lift axle wheel assembly to move into its downward engaged position.

While this invention has been described in detail with particular reference to a preferred embodiment thereof, it will be understood that variations and modifications can be effected within the spirit and the scope of the invention as described hereinbefore and as defined in the appended claims.

What is claimed is:

1. A lift axle wheel assembly comprising:
   (a) a frame for joining said axle assembly to a load-carrying vehicle;
   (b) a pair of trailing arm assemblies, each said respective arm assembly having a first end, a second end and pivot means located between said first end and said second end;
   (c) a pair of caster adjusting torque arms, each said respective torque arm having a first end terminating in a first resilient bushing, and a second end terminating in a second resilient bushing, said second end being angled obliquely outward from said first end of said torque arm, said first resilient bushing being pivotably connected to a bolster pivot bracket by a first mechanical fastener, the central axis of said first mechanical fastener being perpendicular to the central axis of said caster adjusting torque arm, and said second resilient bushing being pivotably connected to an axle pivot bracket by a second mechanical fastener, with the central axis of said second mechanical fastener being perpendicular to the central axis of said caster adjusting torque arm;

(d) a pair of first pneumatic means acting against said frame for urging said first end of said respective trailing arm assembly in a downward direction;

(e) a pair of bolster members fixedly connected to said frame and said first end of said respective trailing arm assembly; and (f) a pair of second pneumatic means acting against said second end of said respective trailing arm assembly in a direction opposite said first pneumatic means.

2. The lift axle wheel assembly of claim 1 wherein each said pivot means of said respective trailing arm assembly includes a pivot arm having a hole, and a portion of compression tubing on each side of said pivot arm, with each said portion of said compression tubing being substantially enclosed within a bushing sleeving and a compression insert collar.

3. The lift axle wheel assembly of claim 2 wherein said pivot means further includes a compression ring.

4. The lift axle wheel assembly of claim 3 wherein at least one corner of said bushing sleeving has a curved radius and at least one corner of said compression ring has a conforming curved radius.

5. The lift axis wheel assembly of claim 1 wherein each said first end of said respective trailing arm assembly terminates in a bushing sleeve into which a resilient bushing is inserted.

6. The lift axle wheel assembly of claim 5 wherein said resilient bushing is of urethane material.

7. The lift axle wheel assembly of claim 5 wherein each said first end of said respective trailing arm assembly is pivotably attached to an axle perch ear fixedly attached to an axle perch, said axle perch ear having a tab which matingly engages a slot in said axle perch.

8. The lift axle wheel assembly of claim 5 wherein each said pivot means of said respective trailing arm assembly includes compression tubing having a lesser diameter and thickness than the diameter and thickness of each said resilient bushing at said first end of said respective trailing arm assembly.

* * * * *

UNITED STATES PATENT AND TRADEMARK OFFICE
CERTIFICATE OF CORRECTION

PATENT NO.   :   5,230,528
DATED        :   July 27, 1993
INVENTOR(S)  :   Wayne B. Van Raden et al.

It is certified that error appears in the above-identified patent and that said Letters Patent is hereby corrected as shown below:

In the Abstract:
        Lines 1, 4 and 6   Change all occurrences of "left" to --lift--.

Col. 4, Line 18   Delete "left" and insert --lift--;

Line 40   After "(FIG." insert --3--.

Col. 5, Line 4   After "arm" insert --52--.

Signed and Sealed this

Twenty-sixth Day of July, 1994

Attest:

BRUCE LEHMAN

*Attesting Officer*    *Commissioner of Patents and Trademarks*